(12) United States Patent
Kakande (10) Patent No.: US 10,355,821 B2
(45) Date of Patent: Jul. 16, 2019

(54) PROBABILISTIC SIGNAL SHAPING USING A SELF-REFERENCING SEQUENCE

(71) Applicant: Nokia Solutions and Networks OY, Espoo (FI)

(72) Inventor: Joseph K. Kakande, New York, NY (US)

(73) Assignee: Nokia Solutions and Networks OY, Espoo (FI)

( * ) Notice: Subject to any disclaimer, the term of this patent is extended or adjusted under 35 U.S.C. 154(b) by 0 days.

(21) Appl. No.: 15/623,015

(22) Filed: Jun. 14, 2017

(65) Prior Publication Data

US 2018/0367246 A1 Dec. 20, 2018

(51) Int. Cl.
*H04L 5/12* (2006.01)
*H04L 1/00* (2006.01)
*G06N 7/00* (2006.01)

(52) U.S. Cl.
CPC ........... *H04L 1/0054* (2013.01); *G06N 7/005* (2013.01)

(58) Field of Classification Search
CPC .............................. H04L 1/0054; G06N 7/005
USPC ........................................................ 375/265
See application file for complete search history.

(56) References Cited

U.S. PATENT DOCUMENTS

| | | | |
|---|---|---|---|
| 4,304,962 A | 12/1981 | Fracassi et al. | |
| 5,970,098 A * | 10/1999 | Herzberg | H04L 1/0041 375/262 |
| 7,721,184 B2 * | 5/2010 | Luby | H03M 13/03 714/781 |
| 7,778,341 B2 | 8/2010 | Tong et al. | |
| 8,345,796 B2 | 1/2013 | Robinson et al. | |
| 8,660,203 B2 | 2/2014 | Zhou et al. | |
| 9,444,580 B2 * | 9/2016 | Conway | H03M 13/611 |
| 9,698,939 B2 * | 7/2017 | Oveis Gharan | H04L 1/0042 |
| 2004/0208647 A1 * | 10/2004 | Gill | H04B 10/505 398/188 |
| 2005/0163242 A1 * | 7/2005 | Ungerboeck | H04L 1/0057 375/261 |

(Continued)

FOREIGN PATENT DOCUMENTS

EP 1193936 A3 10/2002

OTHER PUBLICATIONS

Vandana, A., et al., "A Review of Constellation Shaping and BICM-ID of LDPC Codes for DVB-S2 Systems," IJAICT, 2014, vol. 1, No. 1, pp. 98-102.

(Continued)

*Primary Examiner* — Helene E Tayong
(74) *Attorney, Agent, or Firm* — Mendelsohn Dunleavy, P.C.; Yuri Gruzdkov (57) ABSTRACT

A shaping encoder configured to generate a stream of output bit-words, wherein different bit-word values have different respective rates of occurrence to cause the optical transmitter connected to the shaping encoder to transmit constellation symbols of relatively high energy less frequently than constellation symbols of relatively low energy. The stream of output bit-words is self-referencing in that it encodes one of the input bitstreams applied to the shaping encoder in one or more designated bits of the output bit-words and is generated using a dither stream that can be recovered by the shaping decoder solely based on those one or more designated bits. As a result, some of the circuitry used in the shaping encoder at the transmitter and in the shaping decoder at the receiver can be identical, which can advantageously be used, e.g., to reduce the production costs.

15 Claims, 8 Drawing Sheets

(56) References Cited

U.S. PATENT DOCUMENTS

| | | | | |
|---|---|---|---|---|
| 2007/0050805 A1* | 3/2007 | Rotenstein | ............ | H04H 20/69 |
| | | | | 725/19 |
| 2007/0223934 A1* | 9/2007 | Osterberg | ............ | H04B 10/524 |
| | | | | 398/159 |
| 2012/0148255 A1* | 6/2012 | Liu | ............ | H04B 10/50 |
| | | | | 398/136 |
| 2013/0089326 A1* | 4/2013 | Djordjevic | ............ | H04J 14/04 |
| | | | | 398/44 |
| 2017/0272207 A1* | 9/2017 | Oveis Gharan | ....... | H04L 1/0042 |
| 2017/0353247 A1* | 12/2017 | Yaman | ............ | H04B 10/541 |
| 2018/0026725 A1* | 1/2018 | Cho | ............ | H04L 1/0041 |

OTHER PUBLICATIONS

Valenti, Matthew C., et al., "Constellation Shaping for Bit-Interleaved LDPC Coded APSK," IEEE Transactions on Communications, 2012, vol. 60, No. 10, pp. 2960-2970.

S. Chandrasekhar, et al., "High-spectral-efficiency transmission of PDM 256-QAM with Parallel Probabilistic Shaping at Record Rate-Reach Trade-offs," ECOC 2016—Post Deadline Paper; 42nd European Conference on Optical Communication, Dusseldorf, Germany, 2016, pp. 1-3.

Palgy, Nir, et al., "Dithered probabilistic shaping," (IEEEI), 2012 IEEE 27th Convention of Electrical & Electronics Engineers in Israel, 2012, pp. 1-5.

Malik, Jamshaid Sarwar, et al., "Gaussian Random Number Generation: A Survey on Hardware Architectures,". ACM Comput. Surv. 49, 3, Article 53, 2016, 37 pages.

M. P. Yankovn et al., "Constellation Shaping for WDM Systems Using 256QAM/1024QAM With Probabilistic Optimization," Journal of Lightwave Technology, 2016, vol. 34, No. 22, pp. 5146-5156.

Thomas, David B., "Parallel generation of Gaussian random numbers using the Table-Hadamard transform," 21st Annual International IEEE Symposium on Field-Programmable Custom Computing Machines, 2013, pp. 161-168.

\* cited by examiner

PROBABILISTIC SIGNAL SHAPING USING A SELF-REFERENCING SEQUENCE

BACKGROUND

Field

The present disclosure relates to optical communication equipment and, more specifically but not exclusively, to methods and apparatus for transmitting information using probabilistic signal shaping and/or self-referencing sequences.

Description of the Related Art

This section introduces aspects that may help facilitate a better understanding of the disclosure. Accordingly, the statements of this section are to be read in this light and are not to be understood as admissions about what is in the prior art or what is not in the prior art.

Signal shaping can beneficially provide energy savings often referred to as the shaping gain. In a typical implementation of signal shaping, constellation symbols of relatively large energy are transmitted less frequently than constellation symbols of relatively small energy. For example, when constellation symbols are transmitted over a linear communication channel with a rate of occurrence that approximates a continuous Gaussian distribution in every dimension of the operative constellation, the shaping gain can theoretically approach 1.53 dB.

SUMMARY OF SOME SPECIFIC EMBODIMENTS

Disclosed herein are various embodiments of a shaping encoder configured to generate a stream of output bit-words, wherein different bit-word values have different respective rates of occurrence to cause the optical transmitter connected to the shaping encoder to transmit constellation symbols of relatively high energy less frequently than constellation symbols of relatively low energy. The stream of output bit-words is self-referencing in that it encodes one of the input bitstreams applied to the shaping encoder in one or more designated bits of the output bit-words and is generated using a dither stream that can be recovered by the shaping decoder solely based on those one or more designated bits. As a result, some of the circuitry used in the shaping encoder at the transmitter and in the shaping decoder at the receiver can be identical, which can advantageously be used, e.g., to reduce the production costs.

An example embodiment of the shaping encoder implements a fixed-in/fixed-out (FIFO) signal-shaping scheme under which the ratio between the number of bits supplied by the input data and the number of constellation symbols in the corresponding shaped constellation sequence is a constant that does not depend on the size of the input data.

Some embodiments can incorporate a forward-error-correction (FEC) encoder at the transmitter and a corresponding FEC decoder at the receiver.

According to an example embodiment, provided is an apparatus comprising: an optical data transmitter that comprises an optical modulator and an electronic encoder, the electronic encoder being configured to: redundancy-encode an input data stream based on a seed bitstream, the seed bitstream being a sub-stream of the input data stream; and drive the optical modulator to modulate an optical carrier to carry a resulting redundancy-encoded data stream as a corresponding stream of constellation symbols such that the seed bitstream determines a stream of sign or parity values of the constellation symbols; and wherein the stream of the constellation symbols is such that an occurrence rate of specific constellation symbols therein decreases with symbol energies.

According to another example embodiment, provided is an apparatus comprising: an optical data receiver that comprises an optical demodulator and an electronic decoder connected to receive a stream of values measured by the optical demodulator, the electronic decoder being configured to extract a bitstream of sign or parity values from the measured stream of values, the electronic decoder further being configured to redundancy-decode the stream of measured values based on a pseudorandom process in which the bitstream of sign or parity values is a seed bitstream; and wherein the stream of values measured by the optical demodulator represents a stream of constellation symbols in which an occurrence rate of specific constellation symbols decreases with symbol energies.

According to yet another example embodiment, provided is an apparatus comprising: an electronic encoder configured to generate a stream of output bit-words in response to an input data stream, said input data stream including a seed bitstream as a sub-stream thereof, each of said output bit-words being generated to encode a corresponding bit of the seed bitstream in a designated bit thereof, wherein different values of said output bit-words have different respective rates of occurrence; and an optical transmitter operatively coupled to the electronic encoder to transmit a modulated optical signal carrying a sequence of constellation symbols generated using the stream of output bit-words.

According to yet another example embodiment, provided is a communication method comprising the steps of: configuring a shaping encoder to generate a stream of output bit-words in response to a plurality of input bitstreams, said plurality including a seed bitstream, each of said output bit-words being generated to encode a corresponding bit of the seed bitstream in a designated bit thereof, wherein different values of the output bit-words have different respective rates of occurrence; and operatively coupling an optical transmitter to the shaping encoder, the optical transmitter being capable of transmitting a modulated optical signal carrying a sequence of constellation symbols generated using the stream of output bit-words.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION

Modern FEC codes, such as low-density parity-check (LDPC) codes, already approach the constrained Shannon limit to within approximately 0.5 dB. Hence, further investment in the development of better and/or more-sophisticated FEC codes can only provide diminished returns that are limited by this relatively low incremental value of the FEC-coding gain. For comparison, a practically attainable value of the shaping gain can be approximately 1 dB for linear channels, and even higher for nonlinear channels. Due to the latter value being higher than the still-possible increase of the FEC-coding gain (i.e., 1 dB>0.5 dB), development of methods and apparatus for signal shaping is currently being pursued by the telecom industry. Signal-shaping methods that can be implemented with relatively low complexity and/or cost of the corresponding circuits appear to be especially desirable.

There are two general types of signal shaping that are referred to as geometric and probabilistic, respectively. Geometric shaping can be implemented to optimize the location of constellation points (symbols) on the complex plane for a fixed (but not necessarily uniform) symbol probability. Probabilistic shaping can be implemented to optimize the probability of constellation symbols that are located on a fixed (but not necessarily uniform) grid on the complex plane. Although both types of signal shaping can theoretically be implemented to achieve the shaping gain of up to 1.53 dB for an additive-white-Gaussian-noise (AWGN) channel, probabilistic shaping offers several important advantages over geometric shaping. These advantages include but are not limited to compatibility with conventional (e.g., available off-the-shelf) constellations and FEC codes.

Figure 1:
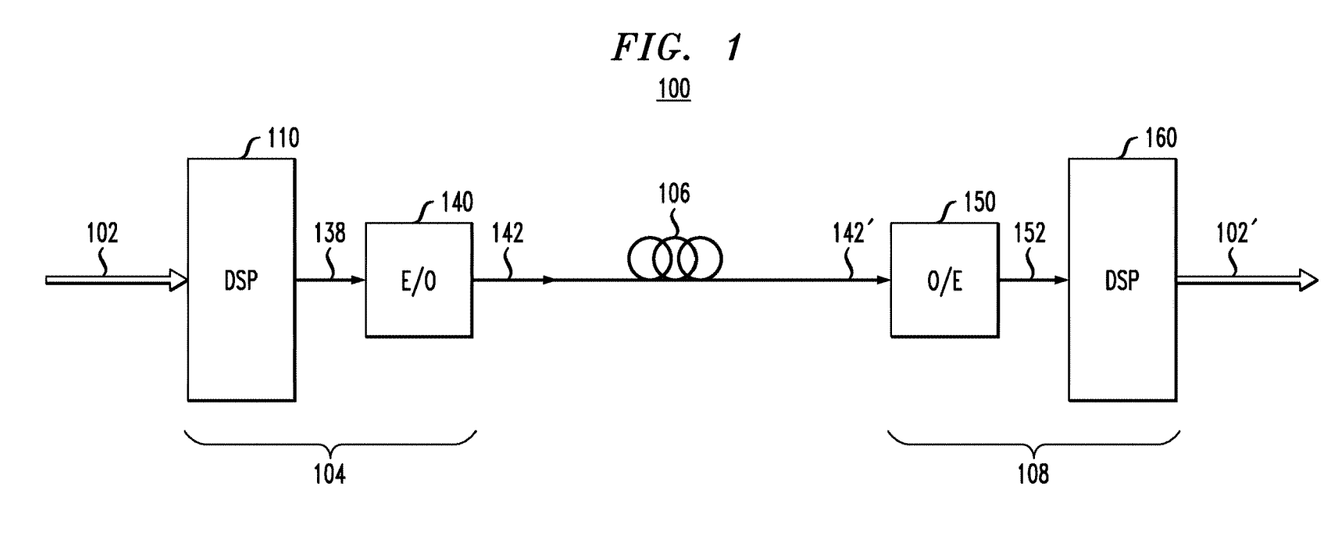
FIG. 1 shows a block diagram of a communication system according to an embodiment.

FIG. 1 shows a block diagram of a communication system 100 according to an embodiment. System 100 comprises a transmitter 104 and a receiver 108 that are coupled to one another by way of a communication link 106. Typically, communication link 106 is implemented using an optical fiber or fiber-optic cable.

System 100 carries out probabilistic signal shaping using a digital signal processor (DSP) 110 at transmitter 104 and a DSP 160 at receiver 108. DSP 110 operates to transform input data 102 into a corresponding sequence 138 of constellation symbols in which different constellation symbols appear with different respective rates of occurrence. An electrical-to-optical (E/O) converter (also sometimes referred-to as the transmitter's front end) 140 of transmitter 104 then uses sequence 138 to generate a corresponding modulated optical signal 142 suitable for transmission over link 106 and having encoded thereon the constellation symbols of sequence 138.

As used herein, the term "constellation symbol" should be construed to encompass both constellation symbols of a one-dimensional constellation and of a multi-dimensional constellation. An example one-dimensional constellation enables the transmission of a single constellation symbol in a single signaling interval (time slot) over a single dimension of the carrier. In contrast, a multi-dimensional constellation enables the transmission of a single constellation symbol using multiple signaling intervals and/or multiple dimensions of the carrier. A D-dimensional constellation can be constructed using D different one-dimensional constellations or D copies of the same one-dimensional constellation.

Link 106 typically imparts noise and other linear and/or nonlinear signal impairments (not explicitly shown in FIG. 1) onto communication signal 142 and delivers a resulting impaired (e.g., noisier) communication signal 142' to optical-to-electrical (O/E) converter (also sometimes referred-to as the receiver's front end) 150 of receiver 108. O/E converter 150 operates to convert the received communication signal 142' into a corresponding sequence 152 of digital (e.g., complex) values. DSP 160 then converts sequence 152 into output data 102'. Provided that the corresponding signal processing in system 100 produces no errors, output data 102' is the same as input data 102.

In an example embodiment, E/O converter 140 can be implemented using one or more conventional optical IQ modulators (not explicitly shown in FIG. 1), while O/E converter 150 can be implemented using one or more conventional coherent (e.g., intradyne or homodyne) optical receivers (also not explicitly shown in FIG. 1).

To mitigate the detrimental effects of noise and/or other signal impairments imparted onto the received communication signal 142' by link 106, DSPs 110 and 160 may be configured to use FEC and/or other conventional or custom error-correction techniques.

An example shaping encoder that can be used to implement DSP 110 is described in more detail below in reference to FIGS. 3-4 and 7. An example shaping decoder that can be used to implement DSP 160 is described in more detail below in reference to FIGS. 5-7.

Figure 2A:
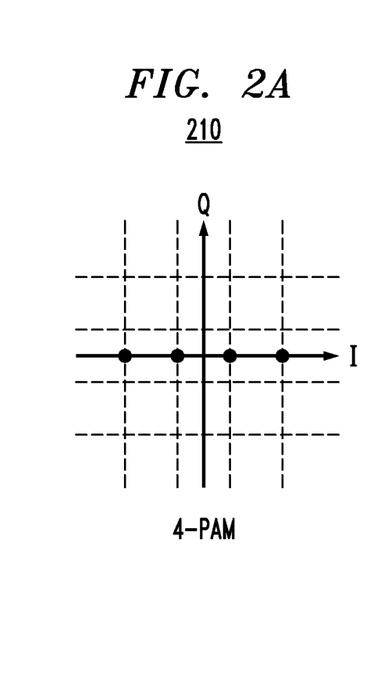
FIGS. 2A-2C graphically show example constellations that can be used in the communication system of FIG. 1 according to some embodiments.
Figure 2B:
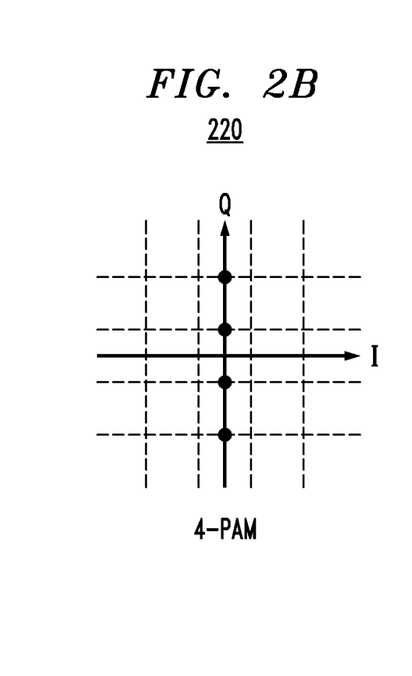
Figure 2C:
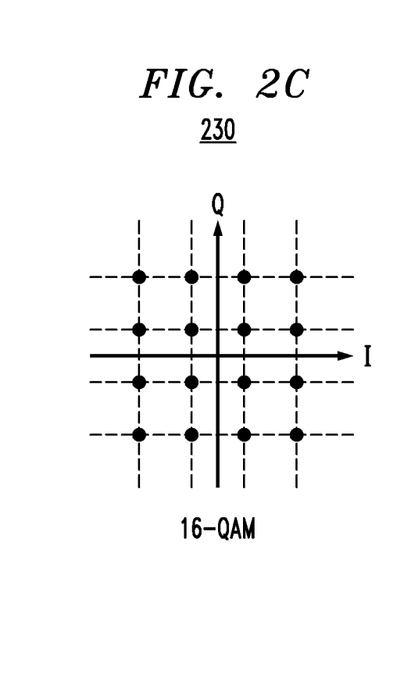

FIGS. 2A-2C graphically show several constellations that can be used in system 100 according to several example embodiments. Each of the shown constellations is a one-dimensional constellation that is depicted as a set of constituent constellation points on a complex plane whose axes are labeled as the I (in-phase) axis and the Q (quadrature) axis.

FIG. 2A graphically shows a 4-PAM (pulse-amplitude-modulation) constellation 210. The four constellation points of constellation 210 are all located on the I-axis and can be represented by the real numbers −3, −1, +1, and +3. Each of the constellation points can be used to encode two bits. In an example bit assignment, the first of the two bits (e.g., the most-significant bit, MSB) can represent the sign of the corresponding real number, and the second of the two bits (e.g., the least-significant bit, LSB) can represent the absolute value (e.g., the amplitude) of the corresponding real number. In this bit assignment scheme, the two bits assigned to a constellation point can be referred to as the sign bit and the amplitude bit, respectively.

FIG. 2B graphically shows a 4-PAM constellation 220. The four constellation points of constellation 220 are all located on the Q-axis and can be represented by the imaginary numbers −3j, −j, +j, and +3j. Each of the constellation points can be used to encode two bits in a manner similar to that of constellation 210 (FIG. 2A).

FIG. 2C graphically shows a 16-QAM (quadrature-amplitude-modulation) constellation 230. A person of ordinary skill in the art will understand that constellation 230 can be generated using a combination of constellations 210 and 220. For example, constellation 230 can be conceptually viewed as constellation 210 (FIG. 2A) in which each constellation point is split into four points using constellation 220 (FIG. 2B). Using the latter concept, an IQ modulator of E/O converter 140 can be configured to generate communication signal 142 that carries constellation symbols (points) of constellation 230 by (i) generating the I component of signal 142 using constellation 210, (ii) generating the Q component of signal 142 using constellation 220, and (iii) appropriately combining the I and Q components.

A person of ordinary skill in the art will understand that other constellations that differ from the example constellations of FIGS. 2A-2C can also be used in system 100. For example, an m-PAM constellation (where m is an even integer greater than four) can be constructed by expanding constellation 210, e.g., by placing additional equally spaced constellation points on the I axis (see FIG. 2A). An n-PAM constellation (where n is an even integer greater than four) can similarly be constructed by expanding constellation 220, e.g., by placing additional equally spaced constellation points on the Q axis (see FIG. 2B). An IQ modulator of E/O converter 140 can then be configured to generate communication signal 142 that carries constellation symbols of an (n×m)-QAM constellation by (i) generating the I component of signal 142 using the m-PAM constellation, (ii) generating the Q component of signal 142 using the n-PAM constellation, and (iii) appropriately combining the I and Q components.

For illustration purposes and without any implied limitation, system 100 is described herein below in reference to an example embodiment in which DSPs 110 and 160 are configured to use a PAM constellation, such as that analogous to constellation 210 (FIG. 2A) or 220 (FIG. 2B). Based on the provided description, a person of ordinary skill in the art will be able to make and use, without any undue experimentation, alternative embodiments of system 100 in which DSPs 110 and 160 are configured to use a PAM or a QAM constellation of any desired size and/or dimension, e.g., constructed as indicated above.

Figure 3:
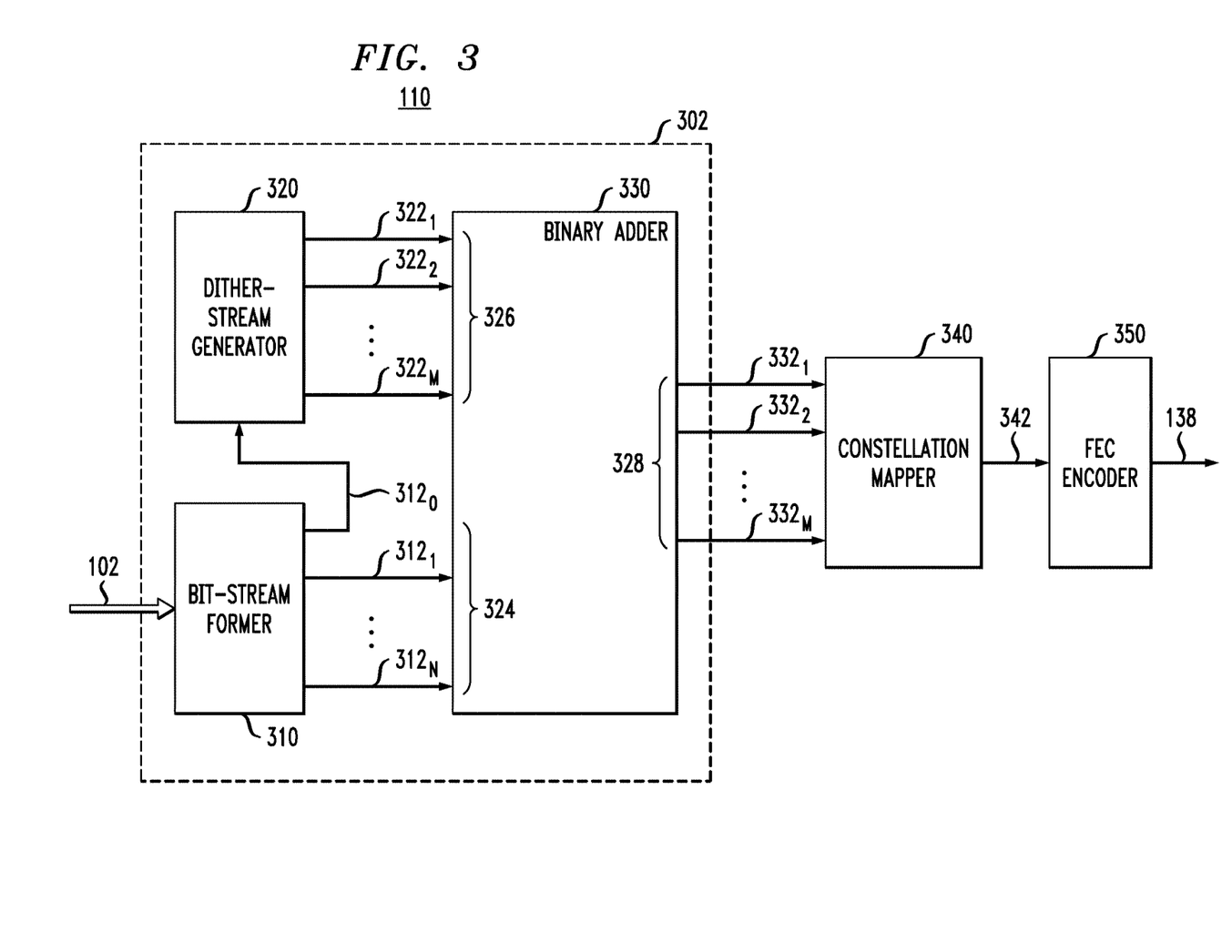
FIG. 3 shows a block diagram of a transmitter's digital signal processor (DSP) that can be used in the communication system of FIG. 1 according to an embodiment.

FIG. 3 shows a block diagram of transmitter's DSP 110 according to an embodiment. Input data 102 and sequence 138 are also shown in FIG. 3 to better illustrate the relationship between the circuits shown in FIGS. 1 and 3.

DSP 110 comprises a shaping encoder 302, a constellation mapper 340, and an optional FEC encoder 350 operatively connected as indicated in FIG. 3. In operation, DSP 110 carries out a fixed-in/fixed-out (FIFO) probabilistic signal shaping under which a fixed-size block of input data 102 is converted into a fixed-size set of constellation symbols of sequence 138. Moreover, the FIFO conversion is performed in a "streaming" fashion, both at shaping encoder 302 and shaping decoder 534 (see FIG. 5), such that the ratio between the number of bits supplied by input data 102 and the number of constellation symbols in the corresponding sequence 138 remains constant and does not depend on the size of input data 102 after dither-stream generator 320 has executed the pertinent initialization procedures. This feature is different from the corresponding feature of some conventional probabilistic-signal-shaping schemes in which either the size of the input data block or the size of the output set of constellation symbols, or both, depend on the binary contents of the input data block. Different variants of such conventional probabilistic-signal-shaping schemes are often referred-to in the relevant literature as variable-in/fixed-out (VIFO), fixed-in/variable-out (FIVO), and variable-in/variable-out (VIVO) schemes. A FIFO scheme may be advantageous over a VIFO, FIVO, or VIVO scheme, e.g., because buffer overflow can typically be avoided in a relatively straightforward manner.

Shaping encoder 302 comprises a bitstream former 310 that operates to transform input data 102 into (N+1) bit-streams that are applied to bit lines $312_0$-$312_N$, respectively, where N is a positive integer greater than one. The transformation performed by bitstream former 310 depends on the format of input data 102 and is directed at causing each of bit lines $312_0$-$312_N$ to carry one bit per time slot, for a total of (N+1) bits per time slot. Bit line $312_0$ is connected to a dither-stream generator 320, and the corresponding bitstream is hereafter referred-to as the "seed bitstream." Bit lines $312_1$-$312_N$ are connected to a binary adder 330.

In an example embodiment, bitstream former 310 operates to cause bit-words 324 formed by the bits carried on bit lines $312_1$-$312_N$ in different time slots to have a constant parity. Each of bit-words 324 has N bits. In some embodiments, each of the N-bit bit-words 324 can have a respective even value. This result can be obtained, e.g., by configuring bitstream former 310 to perform the following processing steps: (i) parsing an N-bit bit-word from input data 102 into a single bit and a bit-word of (N−1) bits; (ii) applying the single bit to bit line $312_0$ to generate the seed bitstream thereon; (iii) multiplying the (N−1)-bit bit-word by two; and (iv) applying the bits of the resulting N-bit bit-word 324 to bit lines $312_1$-$312_N$, respectively. The multiplication by two automatically causes (i) each of the N-bit bit-words 324 to have an even value and (ii) the stream of bit-words 324 to have a constant (even) parity.

In alternative embodiments, other suitable methods for generating constant-parity bit-words 324 can similarly be used to implement bitstream former 310.

In a typical embodiment, input data 102 are such that the different values of N-bit bit-words 324 occur with equal probability. It can therefore be said that the envelope of the corresponding distribution histogram is a rectangular function (also see FIG. 4B). The seed bitstream carried on bit line $312_0$ typically has statistical properties that are similar to those of a relatively long pseudo-random bit sequence.

In some embodiments, input data 102 can be applied to bitstream former 310 in the form of N parallel input bitstreams (not explicitly shown in FIG. 3). In such embodiments, bitstream former 310 can be configured to: (i) apply a selected one of the N input bitstreams to bit line $312_0$; (ii) apply the remaining (N−1) input bitstreams to bit lines $312_1$-$312_{N-1}$, respectively; and (iii) apply a stream of zeros to bit line $312_N$.

Dither-stream generator 320 operates to transform the seed bitstream received by way of bit line $312_0$ into M parallel bitstreams that are applied to bit lines $322_1$-$322_M$, respectively, where M>N. The resulting stream of M-bit bit-words 326 carried on bit lines $322_1$-$322_M$ is hereafter referred to as the dither stream.

Figure 4A:
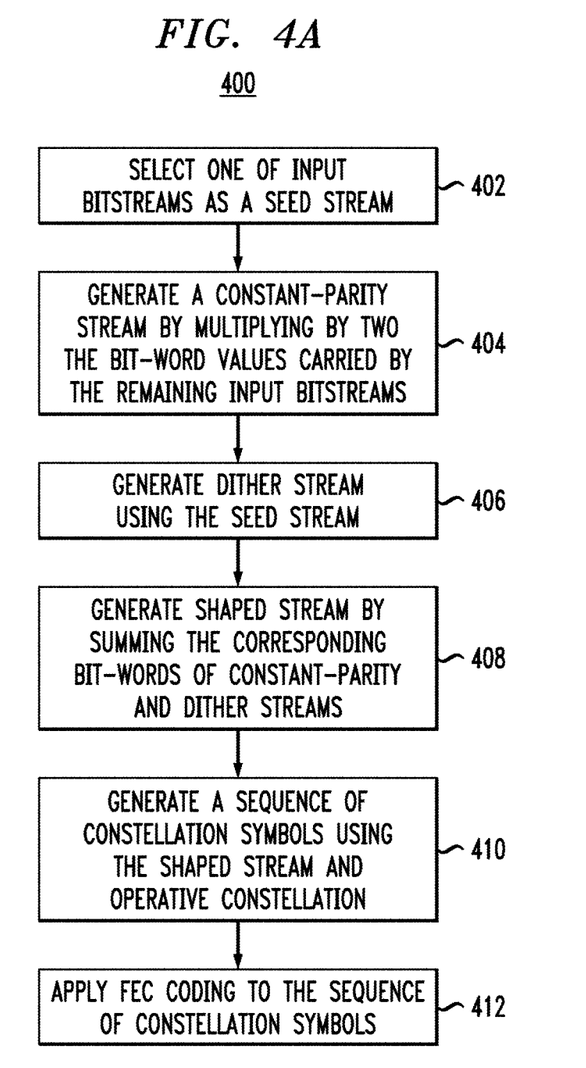
FIGS. 4A-4D illustrate a probabilistic-shaping method that can be used to implement the transmitter's DSP of FIG. 3 according to an embodiment.
Figure 4B:
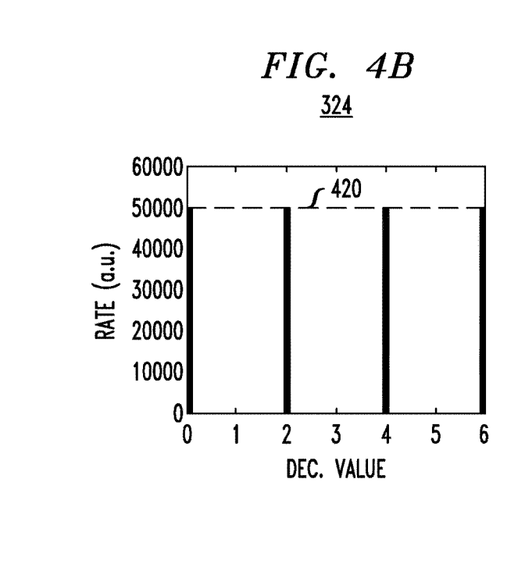
Figure 4C:
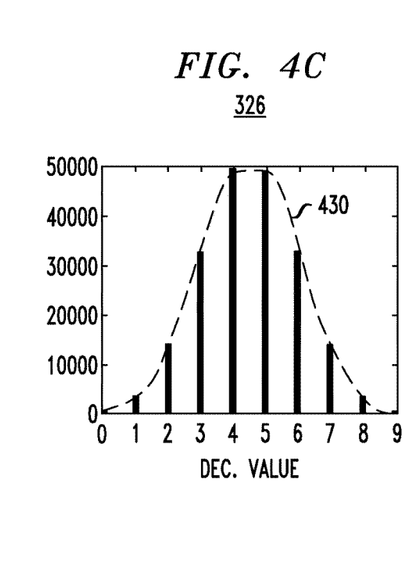

In an example embodiment, dither-stream generator 320 can generate the dither stream to have the following properties:

(i) each bit of the seed bitstream received by way of bit line $312_0$ is encoded as a sign bit of the corresponding M-bit bit-word 326;

(ii) the values of bit-words 326 have a non-uniform rate of occurrence, and form a distribution histogram that can configured to be approximated by any selected function, e.g., a truncated Gaussian (see, e.g., FIG. 4C). As used herein the term "truncated Gaussian" refers to a distribution of quantized digital values located within a fixed range of values, wherein the rate of occurrence of said quantized digital values is represented by a Gaussian function. The envelope of the truncated Gaussian is a Gaussian function; and (iii) the dither stream, as a whole, is self-referencing in a sense that it can be reconstructed by simply observing the sign bit of the constituent bit words 326.

An example circuit structure of dither-stream generator 320 is described in more detail below in reference to FIG. 7.

Binary adder 330 operates to: (i) perform a binary summation of each N-bit bit-word 324 received by way of bit lines $312_1$-$312_N$ and the corresponding M-bit bit-word 326 of the dither stream received by way of bit lines $322_1$-$312_M$, and (ii) apply a resulting M-bit bit-word 328 to bit lines $332_1$-$332_M$. The stream of bit-words 328 carried on bit lines $332_1$-$332_M$ is hereafter referred to as the "shaped stream." Due to the above-indicated properties of the dither stream carrying bit-words 326 and of the constant-parity stream carrying bit-words 324, the values of bit-words 328 have a non-uniform rate of occurrence and form a desired distribution histogram. For example, in embodiments where the values of bit-words 326 form a distribution histogram approximated by a Gaussian, the distribution of values of bit-words 328 can be approximated by a convolution of a Gaussian function and a rectangular function. In addition, the sign bit of each bit-word 328 is the same as the sign bit of the corresponding bit-word 326.

In general, dither-stream generator 320 can be configured to generate the dither stream such that the seed bitstream is encoded in any one or more designated bits of bit-words 326 in a manner that enables receiver 108 (FIG. 1) to recover the seed bitstream and reconstruct the dither stream using the corresponding one or more designated bits of bit-words 328. In the above-described example embodiment, the designated bit of bit-word 328 is the sign bit. In a typical bit-word format used in shaping encoder 302, the sign bit can be the MSB of the corresponding bit-word. However, alternative embodiments in which the designated bit of bit-word 328 differs from the sign bit are also possible, e.g., as described in more detail below in reference to FIG. 7.

For example, in one possible alternative embodiment, the designated bit of bit-word 328 can be the parity bit. In a typical bit-word format used in shaping encoder 302, the parity bit can be the LSB of the corresponding bit-word. This particular embodiment can be used, e.g., when bit word 326 is unsigned. Note however that the concept of being "signed" or "unsigned" is only relative to the used implementation of binary adder 330. More specifically, if binary adder 330 is configured to perform signed arithmetic, then bit word 326 is considered to be a signed bit-word.

In some alternative embodiments, more than one designated bit can be used to encode the seed bitstream in bit-words 326 and 328. In such embodiments, an appropriate bitmask can be used at receiver 108 to recover the seed bitstream and reconstruct the dither stream using the designated bits of bit-words 328.

Constellation mapper 340 operates to transform the shaped stream received by way of bit lines $332_1$-$332_M$ into a corresponding sequence 342 of constellation symbols, wherein constellation symbols of higher energy occur less frequently than constellation symbols of lower energy. The constellation mapping performed by constellation mapper 340 can be implemented in a conventional manner using a suitable constellation, e.g., a constellation analogous to one of the constellations shown in FIGS. 2A-2C. A person of ordinary skill in the art will understand that the non-uniform rate of occurrence of the constellation symbols in sequence 342 is caused by the non-uniform rate of occurrence of the different values of bit-words 328 in the shaped stream generated by shaping encoder 302 in the above-described manner.

FEC encoder 350 operates to add data redundancy to sequence 342, e.g., by adding parity-check constellation symbols. A resulting FEC-encoded sequence of constellation symbols is sequence 138 (also see FIG. 1). The data redundancy in sequence 138 introduced by FEC encoder 350 can be used at receiver 108, e.g., to perform FEC-based error correction that can reduce possible detrimental effects of noise and/or other signal distortions typically present in the received optical signal 142'.

In some embodiments, DSP 110 may include additional signal-processing modules (not explicitly shown in FIG. 3) that can be placed, e.g., between FEC encoder 350 and E/O converter 140 (see FIG. 1). Such additional signal-processing modules may be configured to perform, e.g., one or more of the following: (i) I/Q-imbalance pre-compensation; (ii) signal pre-distortion; (iii) dispersion pre-compensation; and/or (iv) any other conventional signal-processing operations directed at reducing the bit-error rate (BER) at receiver 108.

Figure 4D:
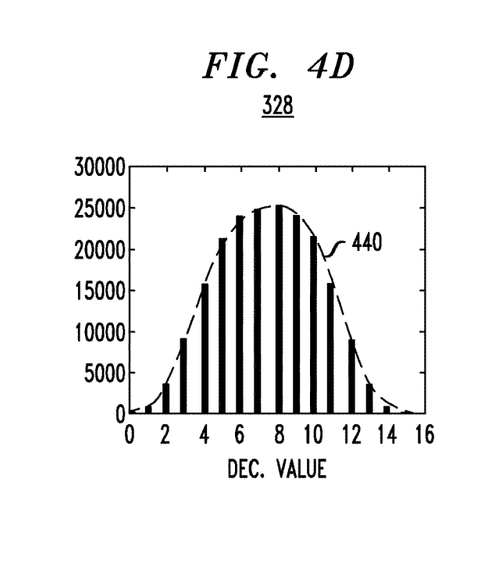

FIGS. 4A-4D illustrate a probabilistic-shaping method 400 that can be used to implement DSP 110 according to an embodiment. More specifically, FIG. 4A shows a flowchart of method 400. FIGS. 4B-4D graphically show statistical properties of certain data streams used in DSP 110 to generate sequence 138. The embodiment illustrated by FIGS. 4A-4D corresponds to N=3 and M=4.

In this particular embodiment, input data 102 comprises three parallel bitstreams, each of which has statistical properties similar to those of a relatively long pseudo-random bit sequence.

At step 402 of method 400, bitstream former 310 directs, by way of bit line $312_0$, a selected one of the three input bitstreams to dither-stream generator 320.

At step 404, bitstream former 310 multiplies by two each 2-bit bit-word provided by the remaining two input bitstreams. The multiplication transforms each such 2-bit bit-word into a corresponding 3-bit bit-word 324, the bits of which are applied to bit lines $312_1$-$312_3$, respectively.

FIG. 4B shows an example histogram that graphically shows the statistical distribution of values of 3-bit bit-words 324 carried on bit lines $312_1$-$312_3$. The abscissa in FIG. 4B represents the decimal value of bit-word 324. The ordinate in FIG. 4B represents the rate of occurrence. As can be seen in FIG. 4B, all bit-words 324 have even values and are in the decimal range [0,6]. An envelope 420 of the distribution is a rectangular function.

At step 406, dither-stream generator 320 transforms the bitstream received on bit line $312_0$ into a stream of 4-bit bit-words 326, the bits of which are then applied to bit lines $322_1$-$322_4$, respectively. The stream of 4-bit bit-words 326 is the dither stream having the above-described characteristics.

FIG. 4C shows an example histogram that graphically shows the statistical distribution of values of 4-bit bit-words 326 of the dither stream carried on bit lines $322_1$-$322_4$. The abscissa in FIG. 4C represents the unsigned decimal value of bit-word 326. The ordinate in FIG. 4C represents the rate of occurrence.

As can be seen in FIG. 4C, all values of bit-words 326 are within the decimal range of [0,9]. This property of bit-words 326 serves to prevent bit-words 328 (see FIG. 4D) from exceeding the length of four bits, e.g., as further explained below. An envelope 430 of the distribution is a Gaussian function.

At step 408, binary adder 330 sums each 3-bit bit-word 324 and the corresponding 4-bit bit-word 326, thereby generating the shaped stream comprising 4-bit bit-words 328. The bits of 4-bit bit-words 328 are applied to bit lines $332_1$-$332_4$.

FIG. 4D shows an example histogram that graphically shows the statistical distribution of values of 4-bit bit-words 328 of the shaped stream carried on bit lines $332_1$-$332_4$. The abscissa in FIG. 4D represents the unsigned decimal value of bit-word 328. The ordinate in FIG. 4D represents the rate of occurrence.

As can be seen in FIG. 4D, the values of bit-words 328 are within the decimal range of [0,15] due to the fact that the constituent 3-bit bit-words 324 and 4-bit bit-words 326 are contained within the decimal ranges [0,6] and [0,9], respectively. Because each bit-word 328 is a sum of the corresponding bit-words 324 and 326, the maximum possible decimal value of bit-word 328 is 15 (=6+9), which enables all possible values of bit-words 328 to be properly expressed using four bits. An envelope 440 of the distribution shown in FIG. 4D is a convolution of the rectangular envelope 420 (FIG. 4B) and the Gaussian envelope 430 (FIG. 4C).

Also note that the histogram shown in FIG. 4D does not have a bar located at the center of envelope 440 (i.e., at decimal value 7.5). This property of the shaped stream helps to reduce the energy of the unmodulated carrier component in signal 142 (FIG. 1).

At step 410, constellation mapper 340 transforms the shaped stream carrying 4-bit bit-words 328 into a corresponding sequence 342 of constellation symbols, wherein constellation symbols of larger energy occur less frequently than constellation symbols of smaller energy. In an example embodiment, constellation mapper 340 can perform this transformation using a 16-PAM constellation.

At step 412, FEC encoder 350 adds parity-check constellation symbols to sequence 342, thereby generating sequence 138 (FIG. 1).

Figure 5:
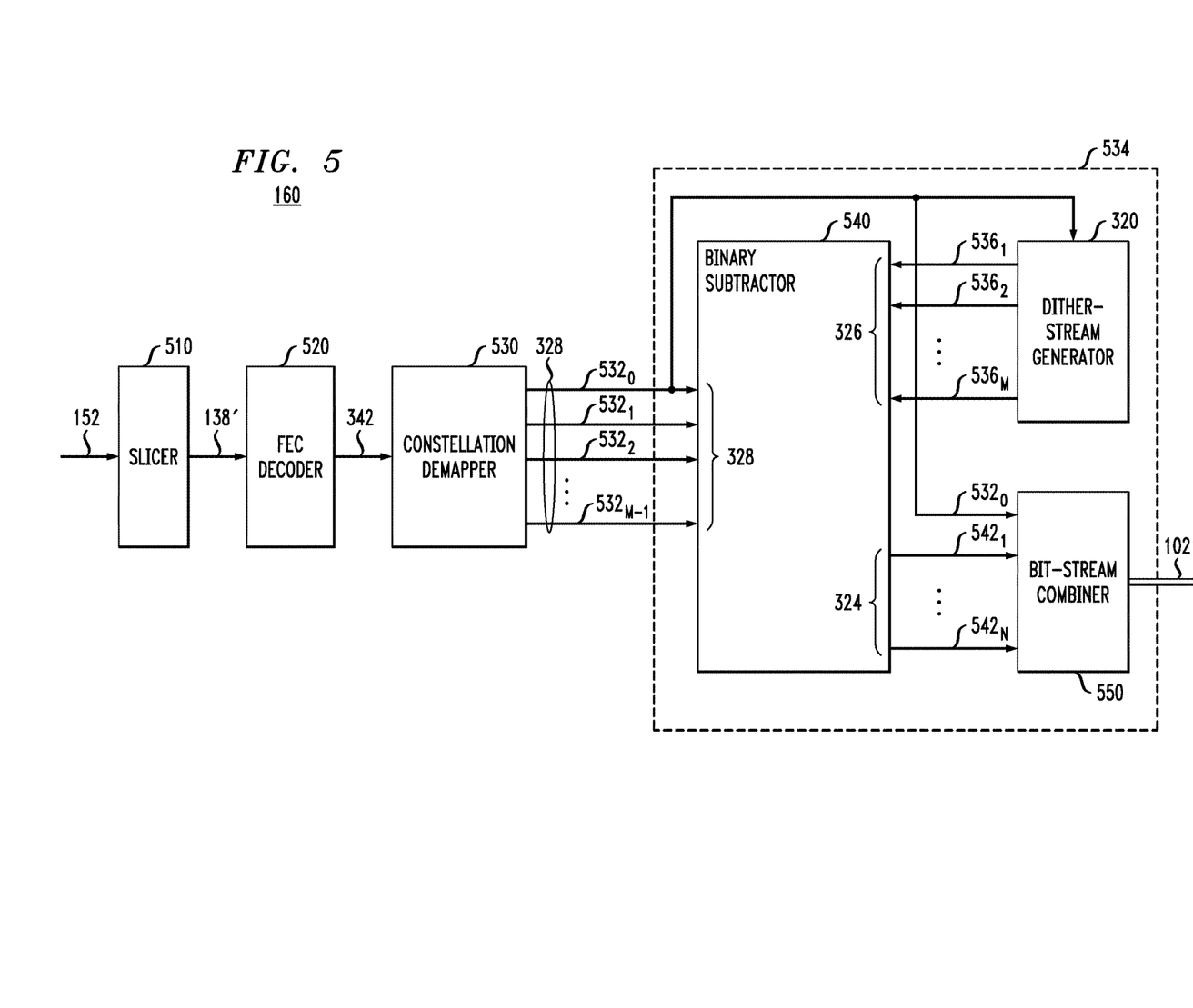
FIG. 5 shows a block diagram of a receiver's DSP that can be used in the communication system of FIG. 1 according to an embodiment.

FIG. 5 shows a block diagram of receiver's DSP 160 according to an embodiment. Input digital signal 152 and output data 102' are also shown in FIG. 5 to better illustrate the relationship between the circuits shown in FIGS. 1 and 5.

DSP 160 comprises a slicer 510, an optional FEC decoder 520, a constellation demapper 530, and a shaping decoder 534 operatively connected as indicated in FIG. 5.

Slicer 510 operates to transform the stream of (e.g., complex) digital samples received by way of input digital signal 152 from O/E converter 150 (FIG. 1) into a sequence 138' of corresponding constellation symbols. In an example embodiment, slicer 510 can be configured to perform the digital-sample slicing in a conventional manner, e.g., by mapping each of the digital samples onto the nearest constellation symbol of the operative constellation. In the absence of noise and signal distortions, sequence 138' is the same as sequence 138 (see, e.g., FIG. 3). However, due to the noise and/or signal distortions imposed by link 106, sequence 138' typically contains errors and, as such, may differ from sequence 138.

FEC decoder 520 operates to correct errors (if any) in sequence 138' using the data redundancy introduced by FEC encoder 350 (FIG. 3). FEC decoder 520 then removes parity-check symbols from the resulting corrected sequence 138, thereby recovering sequence 342 (also see FIG. 3).

Constellation demapper 530 performs a de-mapping operation that is inverse to the mapping operation performed by constellation mapper 340 (FIG. 3). As a result, sequence 342 is converted back into the corresponding shaped stream carrying M-bit bit-words 328 (also see FIG. 3). Constellation demapper 530 then applies the individual bits of bit-words 328 to bit lines $532_0$-$532_{M-1}$, respectively.

In the embodiment compatible with the shaping encoder 302 described above in reference to FIG. 3, the sign bit of each bit-word 328 is applied to bit line $532_0$. As already explained above in reference to FIG. 3, in this embodiment, the sign bit of each bit-word 328 is the same as the corresponding bit of the seed bitstream originally carried on bit line $312_0$. Therefore, in this manner, constellation demapper 530 recovers the original seed bitstream used by shaping encoder 302 in the process of generating the shaped stream carrying bit-words 328. The remaining (M−1) bits of each bit-word 328 are applied to bit lines $532_1$-$532_{M-1}$, respectively.

Shaping decoder 534 comprises a nominal copy of dither-stream generator 320, another instance of which is used at shaping decoder 302 (see FIG. 3). Bit line $532_0$ operates to apply the recovered seed bitstream to dither-stream generator 320 of shaping decoder 534. As a result, in response to receiving the recovered seed stream, dither-stream generator 320 of shaping decoder 534 regenerates the original dither stream carrying M-bit bit-words 326. The dither-stream generator 320 then applies the individual bits of bit-words 326 to bit lines $536_1$-$536_M$, respectively.

Shaping decoder 534 further comprises a binary subtractor 540 configured to (i) subtract each M-bit bit-word 326 of the dither stream received on bit lines $536_1$-$536_M$ from the corresponding M-bit bit-word 328 of the shaped stream received on bit lines $532_0$-$532_{M-1}$, and (ii) apply the resulting N-bit bit-word 324 to bit lines $542_1$-$542_N$, respectively. The subtraction performed by binary subtractor 540 is in effect an inverse operation to the summation performed by binary adder 330 (FIG. 3).

Shaping decoder 534 further comprises a bitstream combiner 550 configured to combine the bitstreams received on bit lines $532_0$ and $542_1$-$542_N$ in a manner that is inverse to the operation carried out by bit-stream former 310 (FIG. 3). In an example embodiment, bitstream combiner 550 can be configured to (i) divide by two each of the N-bit bit-words 324 received on bit lines $542_1$-$542_N$; (ii) combine each of the resulting (N−1)-bit bit-words with the corresponding bit of the seed stream received on bit line $532_0$; and (iii) transform the resulting sequence of N-bit bit-words into output data 102'. As already indicated above, in the absence of processing errors, output data 102' are the same as input data 102 (FIG. 3).

In some embodiments, DSP 160 may include additional signal-processing modules (not explicitly shown in FIG. 5) that can be placed, e.g., between slicer 510 and 0/E converter 150 (see FIG. 1). Such additional signal-processing modules may be configured, in a conventional manner, to perform, e.g., one or more of the following: (i) clock recovery; (ii) dispersion compensation; (iii) various types of signal-equalization processing; and/or (iv) any other signal-processing operations directed at reducing the BER at receiver 108.

In some embodiments, FEC encoder 350 (FIG. 3) and FEC decoder 520 (FIG. 5) can be removed from the transmitter's DSP 110 and the receiver's DSP 160, respectively.

Figure 6:
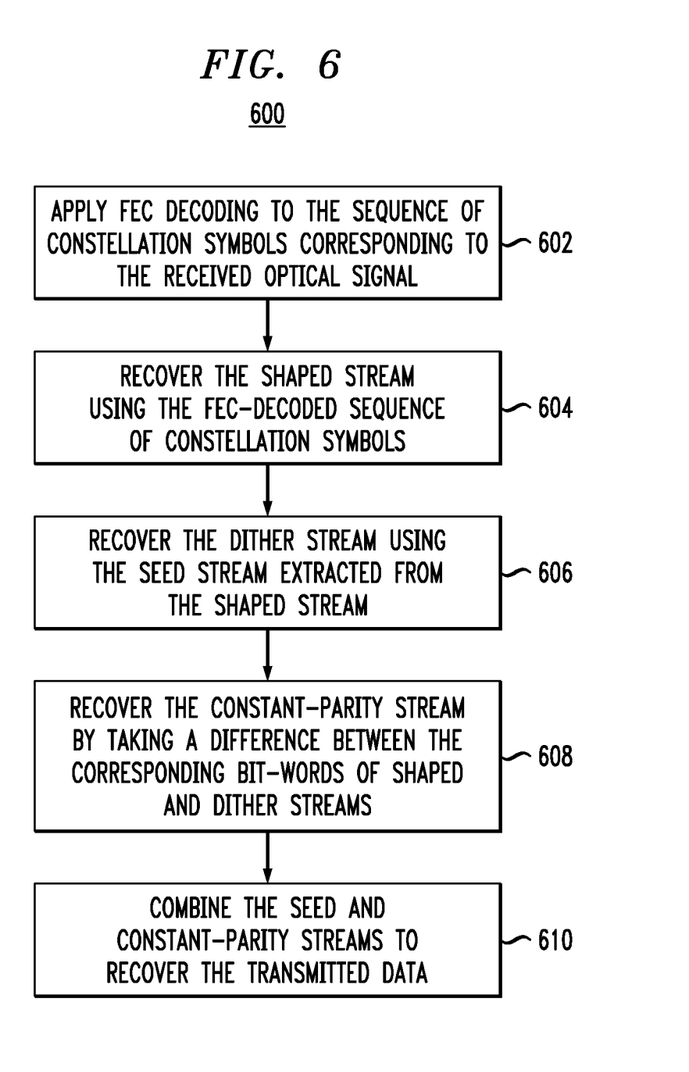
FIG. 6 shows a probabilistic-shaping method that can be used to implement the receiver's DSP of FIG. 5 according to an embodiment.

FIG. 6 shows a flowchart of a probabilistic-shaping method 600 that can be used to implement DSP 160 according to an embodiment. Method 600 is designed to be compatible with method 400 (FIG. 4). For the embodiment corresponding to N=3 and M=4, statistical properties of certain data streams generated using method 600 may be similar to those graphically shown in FIGS. 4B-4D.

At step 602 of method 600, FEC decoder 520 uses parity-check symbols to correct errors (if any) in sequence 138' received from slicer 510 (FIG. 5). FEC decoder 520 then removes the parity-check symbols, thereby recovering sequence 342 (also see FIG. 3).

At step 604, constellation demapper 530 converts each constellation symbol of sequence 342 into the corresponding M-bit bit-word 328, thereby recovering the shaped stream originally generated by shaping encoder 302 (FIG. 3). The conversion performed by constellation demapper 530 can be based on a conventional de-mapping operation that is inverse to the mapping operation performed by constellation mapper 340 (FIG. 3). Example statistical properties of the recovered shaped stream are graphically shown in FIG. 4D.

Constellation demapper 530 operates to apply the individual bits of bit-words 328 of the recovered shaped stream to bit lines $532_0$-$532_{M-1}$, respectively. More specifically, the sign bit of each bit-word 328 is applied to bit line $532_0$. The resulting bitstream on bit line $532_0$ is the same as the seed bitstream originally carried on bit line $312_0$ of shaping encoder 302 (FIG. 3). The remaining (M−1) bits of each recovered bit-word 328 are applied to bit lines $532_1$-$532_{M-1}$, respectively.

At step 606, dither-stream generator 320 is used to transform the recovered seed bitstream received by way of bit line $532_0$ into the corresponding dither stream carrying M-bit bit-words 326, the bits of which are applied to bit lines $536_1$-$536_M$, respectively. Example statistical properties of the dither stream generated in this manner are graphically shown in FIG. 4C. In some embodiments, step 606 may be implemented using the same processing sub-steps as those of step 406 of method 400 (FIG. 4A).

At step 608, binary subtractor 540 recovers the constant-parity stream carrying N-bit bit-words 324 by subtracting each M-bit bit-word 326 of the recovered dither stream received on bit lines $536_1$-$536_M$ from the corresponding M-bit bit-word 328 of the recovered shaped stream received on bit lines $532_0$-$532_{M-1}$. Binary subtractor 540 then applies the individual bits of the recovered N-bit bit-words 324 to bit lines $542_1$-$542_N$, respectively. Example statistical properties of the recovered constant-parity stream carrying bit-words 324 are graphically shown in FIG. 4B.

At step 610, bitstream combiner 550 recovers data 102 by (i) dividing by two each of the N-bit bit-words 324 received on bit lines $542_1$-$542_N$; (ii) combining each of the resulting (N−1)-bit bit-words with the corresponding bit of the seed bitstream received on bit line $532_0$; and (iii) transforming the resulting sequence of N-bit bit-words into output data 102'. In an example embodiment, bitstream combiner 550 is configured to combine the bitstreams received on bit lines $532_0$ and $542_1$-$542_N$ in a manner that is inverse to the bitstream-forming operation performed by bitstream former 310 in shaping encoder 302 (FIG. 3).

Figure 7:
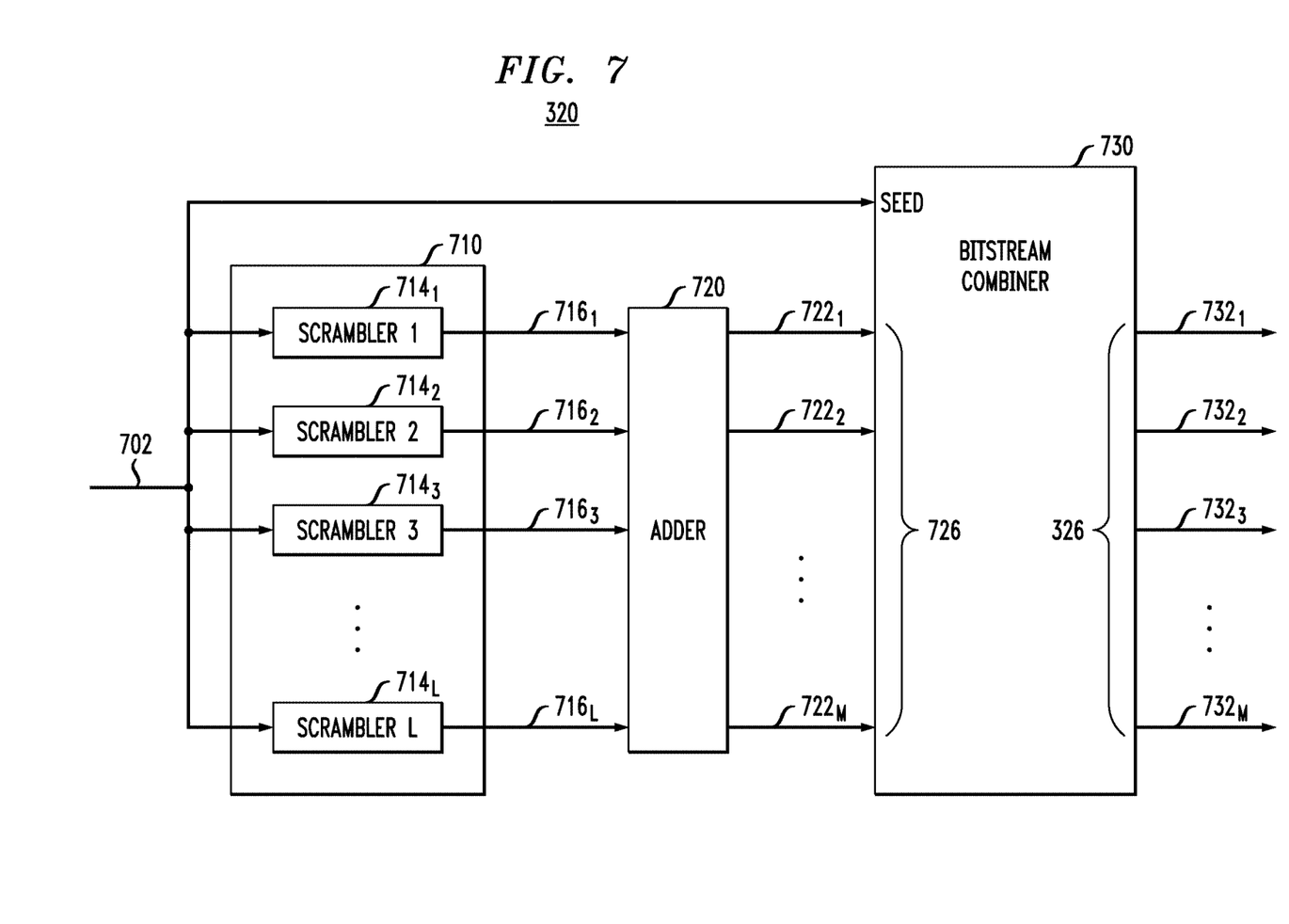
FIG. 7 shows a block diagram of a dither-stream generator that can be used in the communication system of FIG. 1 according to an embodiment.

FIG. 7 shows a block diagram of dither-stream generator 320 according to an embodiment. As already indicated above, both shaping encoder 302 and shaping decoder 534 can employ a respective instance (nominal copy) of dither-stream generator 320 shown in FIG. 7

When dither-stream generator 320 of FIG. 7 is used in shaping encoder 302, an input bit line 702 thereof is connected to bit line $312_0$, and output bit lines $732_1$-$732_M$ thereof are connected to bit lines $322_1$-$322_M$, respectively (also see FIG. 3). When dither-stream generator 320 of FIG. 7 is used in shaping decoder 534, input bit line 702 is connected to bit line $532_0$, and output bit lines $732_1$-$732_M$ are connected to bit lines $536_1$-$536_M$, respectively (also see FIG. 5).

In an example embodiment, dither-stream generator 320 comprises a scrambler array 710 that includes scramblers $714_1$-$714_L$, each connected to receive a respective copy of the seed bitstream applied to input bit line 702 by the corresponding upstream circuits of shaping encoder 302 or shaping decoder 534. The number L of scramblers 714 in array 710 depends on the particular embodiment and can be selected, e.g., to be the same as the number of different possible values that M-bit bit-words 326 can take. For example, in the embodiment corresponding to FIG. 4B, L=10. Note that, typically, the number L is selected such that $L < 2^M$, which provides a margin that can accommodate the addition to M-bit bit-words 326 of N-bit bit-words 324 without causing an overflow over M bits of the length of the resulting bit-words 328 (see, e.g., the above description of adder 330, FIG. 3, and FIGS. 4B-4D).

In an example embodiment, a scrambler 714 operates to deterministically change the order of bits in the seed bitstream received on bit line 702, thereby generating a corresponding scrambled bitstream 716. As already indicated above, the seed bitstream typically has statistical properties that are similar to those of a pseudo-random bit sequence. Scrambler 714 changes the order of bits in the seed bitstream such that the resulting scrambled bitstream 716 also has statistical properties that are similar to those of a pseudo-random bit sequence. However, the scrambling operation carried out by scrambler 714 is deterministic (i.e., reproducible) in the sense that, in response to the same input sequence of binary values received by way of bit line 702, the scrambler outputs on the bit line 716 the same corresponding scrambled sequence of binary values.

Scramblers $714_1$-$714_L$ differ from one another in that different scramblers 714 are configured to change the order of bits of the seed bitstream in different respective manners. As a result, scrambled bitstreams $716_1$-$716_L$ differ from one another despite being generated in response to the same seed bitstream received on bit line 702. Typically, scramblers $714_1$-$714_L$ are configured to use different respective deterministic scrambling algorithms selected such that scrambled bitstreams $716_1$-$716_L$ exhibit approximate statistical independence from one another on a specified time scale. In an example embodiment, such time scale can be, e.g., on the order of 100 time slots.

Scrambled bitstreams $716_1$-$716_L$ are applied to an adder 720 that is configured to: (i) in each time slot, compute a sum of the binary values that the scrambled bitstreams apply to the adder in that time slot, and (ii) apply the individual bits of a resulting M-bit bit-word 726 to bit-lines $722_1$-$722_M$, respectively. Due to the above-described properties of scrambled bitstreams $716_1$-$716_L$, the possible values of the M-bit bit-words 726 have a non-uniform rate of occurrence and form a distribution histogram that can be approximated by a truncated Gaussian.

Dither-stream generator 320 further comprises a bitstream combiner 730 that is configured to generate the dither stream carrying bit-words 326 using (i) a copy of the seed bitstream received on bit line 702 and (ii) the stream of bit-words 726 received from adder 720 on bit-lines $722_1$-$722_M$.

In an example embodiment, bitstream combiner 730 can be configured to carry out the following processing steps:
 (i) reading from the memory the average value of bit-words 726;
 (ii) subtracting the average value from each bit-word 726, thereby converting the stream of bit-words 726 into a corresponding zero-mean stream;
 (iii) computing an absolute value of each bit-word in the zero-mean stream; and
 (iv) concatenating each absolute value and the corresponding bit of the seed bitstream to generate the corresponding bit-word 326. The concatenation is performed in the manner that causes each seed bit to be used as the sign bit of the corresponding bit-word 326.

In some embodiments of bitstream combiner 730, processing steps (iii) and (iv) can be implemented as a single processing step that comprises replacing the sign bit of each bit-word in the zero-mean stream by the corresponding seed bit.

As indicated above, in some embodiments, the seed bitstream can be encoded using the parity of the bit-words of the shaped stream, wherein an odd value of the bit-word corresponds to one binary value of the corresponding seed bit, and an even value of the bit-word corresponds to the other binary value of the corresponding seed bit. In such embodiments, shaping decoder 354 can recover each seed bit by simply determining whether the corresponding bit-word 328 of the shaped stream is even or odd. The corresponding embodiment of bitstream combiner 730 can be configured to carry out, e.g., the following example processing steps:
  (i) in each time slot, computing an alternative bit-word value $B_{alt}$ as $B_{alt}=L-1-B_{726}$, where $B_{726}$ is the value of bit-word 726 in that time slot;
  (ii) if the seed bit in the time slot is 0, then selecting $B_{726}$ as the value of the corresponding bit-word 326; and
  (iii) if the seed bit in the time slot is 1, then selecting $B_{alt}$ as the value of the corresponding bit-word 326.
If L is odd, then $B_{alt}$ is even when $B_{726}$ is odd, and $B_{alt}$ is odd when $B_{726}$ is even. As a result, each bit of the seed bitstream can be recovered by shaping decoder 534 by simply determining the parity of the corresponding bit-word 326.

A person of ordinary skill in the art will understand that, in various alternative embodiments, the self-referencing feature can be implemented by encoding the seed stream in the shaped stream in other suitable ways that enable straightforward extraction of the seed-stream at the receiver in a manner that allows the receiver to regenerate the corresponding dither stream used at the transmitter for probabilistic signal shaping and then use the regenerated dither stream to decode the received shaped stream.

According to an example embodiment disclosed above in reference to FIGS. 1-7, provided is an apparatus (e.g., 100, FIG. 1) comprising: an optical data transmitter (e.g., 104, FIG. 1) that comprises an optical modulator (e.g., 140, FIG. 1) and an electronic encoder (e.g., 110, FIG. 3), the electronic encoder being configured to: redundancy-encode an input data stream (e.g., 102, FIG. 3) based on a seed bitstream (e.g., on $312_0$, FIG. 3), the seed bitstream being a sub-stream of the input data stream; and drive the optical modulator to modulate an optical carrier to carry a resulting redundancy-encoded data stream (e.g., 332, FIG. 3) as a corresponding stream of constellation symbols (e.g., 138, FIG. 3) such that the seed bitstream determines a stream of sign or parity values of the constellation symbols; and wherein the stream of the constellation symbols is such that an occurrence rate of specific constellation symbols therein decreases with symbol energies.

In some embodiments of the above apparatus, the stream of sign or parity values of the constellation symbols is a stream of sign values, the seed bitstream determining said stream of sign values.

In some embodiments of any of the above apparatus, the stream of sign or parity values of the constellation symbols is a stream of parity values, the seed bitstream determining said stream of parity values.

In some embodiments of any of the above apparatus, the electronic encoder is configured to redundancy-encode the input data stream in a pseudo-probabilistic manner (e.g., using 710, FIG. 7).

In some embodiments of any of the above apparatus, the electronic encoder is configured to maintain a constant ratio between a number of bits applied thereto by the input data stream and a resulting number of constellation symbols in the corresponding stream of constellation symbols.

In some embodiments of any of the above apparatus, the electronic encoder comprises a dither-stream generator (e.g., 320, FIG. 3) configured to generate a dither stream in response to the seed bitstream, the dither stream comprising a sequence of first bit-words, each of said first bit-words being generated to encode a corresponding bit of the seed bitstream in a designated bit thereof; and wherein the electronic encoder is configured to generate the corresponding stream of constellation symbols using the dither stream.

In some embodiments of any of the above apparatus, the electronic encoder further comprises: a digital circuit (e.g., 310, FIG. 3) configured to generate a stream of second bit-words (e.g., 324, FIG. 3) in response to a plurality of sub-streams of the input data stream, each of said second bit-words being generated to have a fixed parity; and an adder e.g., 330, FIG. 3) operatively connected to the digital circuit and to the dither-stream generator to generate a stream of output bit-words, each of said output bit-words being computed as a sum of a respective one of said first bit-words and a respective one of said second bit-words; and wherein the stream of the constellation symbols is generated using the stream of output bit-words.

In some embodiments of any of the above apparatus, the plurality of sub-streams does not include the seed bitstream.

In some embodiments of any of the above apparatus, the electronic encoder comprises an FEC encoder (e.g., 350, FIG. 3) configured to cause the corresponding stream of constellation symbols to include parity-check constellation symbols.

According to another example embodiment disclosed above in reference to FIGS. 1-7, provided is an apparatus (e.g., 100, FIG. 1) comprising: an optical data receiver (e.g., 108, FIG. 1) that comprises an optical demodulator (e.g., 140, FIG. 1) and an electronic decoder (e.g., 160, FIG. 5) connected to receive a stream (e.g., 152, FIG. 5) of values measured by the optical demodulator, the electronic decoder being configured to extract a bitstream (e.g., on $532_0$, FIG. 3) of sign or parity values from the measured stream of values, the electronic decoder further being configured to redundancy-decode the stream of measured values based on a pseudorandom process (e.g., implemented using 710, FIG. 7; and/or 320, FIG. 5) in which the bitstream of sign or parity values is a seed bitstream; and wherein the stream of values measured by the optical demodulator represents a stream of constellation symbols (e.g., 342, FIG. 5) in which an occurrence rate of specific constellation symbols decreases with symbol energies.

In some embodiments of the above apparatus, the bitstream of sign or parity values extracted by the electronic decoder is a bitstream of sign values.

In some embodiments of any of the above apparatus, the bitstream of sign or parity values extracted by the electronic decoder is a bitstream of parity values.

In some embodiments of any of the above apparatus, the electronic decoder comprises a dither-stream generator (e.g., 320, FIG. 5) configured to generate a dither stream in response to the seed bitstream, the dither stream comprising a sequence of bit-words, each of said bit-words being generated to encode a corresponding bit of the seed bitstream in a designated bit thereof; and wherein the electronic decoder is configured to redundancy-decode the stream of measured values using the dither stream.

In some embodiments of any of the above apparatus, the dither-stream generator is configured to generate the dither stream such that a distribution of values of the bit-words is approximated by a Gaussian function.

According to yet another example embodiment disclosed above in reference to FIGS. 1-7, provided is an apparatus (e.g., 100, FIG. 1) comprising: a shaping encoder (e.g., 302, FIG. 3) configured to generate a stream of output bit-words (e.g., 328, FIG. 3) in response to a plurality of input bitstreams (e.g., 102, FIG. 3), said plurality including a seed bitstream (e.g., on 312$_0$, FIG. 3), each of said output bit-words being generated to encode a corresponding bit of the seed bitstream in a designated (e.g., sign or parity) bit thereof, wherein different values of said output bit-words have different respective rates of occurrence (e.g., as indicated in FIG. 4D); and an optical transmitter (e.g., 340/350/140, FIGS. 1, 3) operatively coupled to the shaping encoder to transmit a modulated optical signal (e.g., 142, FIG. 1) carrying a sequence of constellation symbols (e.g., 138, FIG. 3) generated using the stream of output bit-words.

In some embodiments of the above apparatus, the designated bit is a sign bit or a parity bit.

In some embodiments of any of the above apparatus, the shaping encoder is configured to cause the optical transmitter to generate the sequence of constellation symbols in a manner that causes a rate of occurrence of a constellation symbol to depend on a symbol transmit energy.

In some embodiments of any of the above apparatus, the shaping encoder is configured to maintain a constant ratio between a number of bits applied thereto by the plurality of input bitstreams and a resulting number of said output bit-words (e.g., using the FIFO feature of the probabilistic signal shaping implemented therein).

In some embodiments of any of the above apparatus, the shaping encoder comprises a dither-stream generator (e.g., 320, FIG. 3) configured to generate a dither stream in response to the seed bitstream, the dither stream comprising a sequence of first bit-words (e.g., 326, FIG. 3), each of said first bit-words being generated to encode a corresponding bit of the seed bitstream in a designated (e.g., sign or parity) bit thereof; and wherein the shaping encoder is configured to generate the stream of output bit-words using the dither stream.

In some embodiments of any of the above apparatus, the shaping encoder further comprises: a digital circuit (e.g., 310, FIG. 3) configured to generate a stream of second bit-words (e.g., 324, FIG. 3) in response to a subset of the plurality of input bitstreams, each of said second bit-words being generated to have a fixed parity; and an adder (e.g., 330, FIG. 3) operatively connected to the digital circuit and to the dither-stream generator to generate each of said output bit-words by computing a sum of a respective one of said first bit-words and a respective one of said second bit-words.

In some embodiments of any of the above apparatus, the digital circuit is configured to generate each of said second bit-words to have a respective N-bit value (e.g., carried on 312$_1$-312$_N$, FIG. 3), where N is a positive integer greater than one; wherein the dither-stream generator is configured to generate each of said first bit-words to have a respective M-bit value (e.g., carried on 322$_1$-322$_M$, FIG. 3), where M is a positive integer greater than N; and wherein the dither-stream generator is further configured to cause said first bit-words to have values from a range of values (e.g., as indicated in FIG. 4C) selected such that each of said output bit-words has a respective M-bit value (e.g., carried on 332$_1$-332$_M$, FIG. 3).

In some embodiments of any of the above apparatus, the digital circuit is configured to generate the stream of second bit-words (e.g., 324, FIG. 3) such that the fixed parity causes each of said second bit-words to have a respective even value.

In some embodiments of any of the above apparatus, the subset does not include the seed bitstream (e.g., 312$_0$ removes the seed bitstream before 310 generates 324, FIG. 3).

In some embodiments of any of the above apparatus, the dither-stream generator is configured to generate the dither stream such that different values of the first bit-words have different respective rates of occurrence (e.g., as indicated in FIG. 4C).

In some embodiments of any of the above apparatus, the dither-stream generator is configured to generate the dither stream such that a distribution of values of the first bit-words is approximated by a Gaussian function (e.g., 430, FIG. 4C).

In some embodiments of any of the above apparatus, the dither-stream generator comprises: a plurality of scramblers (e.g., 714$_1$-714$_L$, FIG. 7), each configured to generate a respective scrambled bitstream (e.g., 716$_1$-716$_L$, FIG. 7) in response to receiving a respective copy (e.g., on 702, FIG. 7) of the seed bitstream, the respective scrambled bitstreams being different from one another; an adder (e.g., 720, FIG. 7) configured to generate a stream of second bit-words (e.g., 726, FIG. 7), each of said second bit-words being generated as a sum of binary values carried by the respective scrambled bitstreams in a respective time slot; and a bitstream combiner (e.g., 730, FIG. 7) configured to generate the dither stream using the seed bitstream and the stream of second bit-words.

In some embodiments of any of the above apparatus, each of the plurality of scramblers is configured to generate the respective scrambled bitstream by changing an order of bits of the seed bitstream in a different respective manner.

In some embodiments of any of the above apparatus, the apparatus further comprises an optical receiver (e.g., 108, FIG. 1) optically coupled to the optical transmitter to receive the modulated optical signal; and wherein the optical transmitter includes a nominal copy of the dither-stream generator.

In some embodiments of any of the above apparatus, the designated bit of said first bit-words is a sign bit.

In some embodiments of any of the above apparatus, the designated bit of said first bit-words is a parity bit.

In some embodiments of any of the above apparatus, the apparatus further comprises an FEC encoder (e.g., 350, FIG. 3) operatively connected to the shaping encoder and configured to cause the sequence of constellation symbols to include parity-check constellation symbols.

In some embodiments of any of the above apparatus, the shaping encoder is configured to generate the stream of output bit-words such that a distribution of values of said output bit-words is approximated by a convolution (e.g., 440, FIG. 4D) of a Gaussian function (e.g., 430, FIG. 4C) and a rectangular function (e.g., 420, FIG. 4B).

According to yet another example embodiment disclosed above in reference to FIGS. 1-7, provided is a communication method comprising the steps of: configuring a shaping encoder (e.g., 310-330, FIG. 3) to generate a stream of output bit-words (e.g., 328, FIG. 3) in response to a plurality of input bitstreams (e.g., 102, FIG. 3), said plurality including a seed bitstream (e.g., on 312$_0$, FIG. 3), each of said output bit-words being generated to encode a corresponding bit of the seed bitstream in a designated (e.g., sign or parity) bit thereof, wherein different values of the output bit-words have different respective rates of occurrence (e.g., as indicated in FIG. 4D); and operatively coupling an optical transmitter (e.g., 340/350/140, FIGS. 1, 3) to the shaping encoder, the optical transmitter being capable of transmitting a modulated optical signal (e.g., 142, FIG. 1) carrying a sequence of constellation symbols (e.g., 138, FIG. 3) generated using the stream of output bit-words. While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range. Also, unless explicitly stated otherwise, each named distribution or function type should be interpreted as being an example as if the words "such as" preceded the distribution or function name.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The functions of the various elements shown in the figures, including any functional blocks labeled as "processors" and/or "controllers," may be provided through the use of dedicated hardware as well as hardware capable of executing software in association with appropriate software. Some circuit elements may be implemented using, without limitation, digital signal processor (DSP) hardware, an application specific integrated circuit (ASIC), a field programmable gate array (FPGA), a read only memory (ROM) for storing software, a random access memory (RAM), and non-volatile storage. Other hardware, conventional and/or custom, may also be included.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An apparatus comprising:
an optical data transmitter that comprises an optical modulator and an electronic encoder, the electronic encoder being configured to:
redundancy-encode an input data stream based on a seed bitstream, the seed bitstream being a sub-stream of the input data stream; and
drive the optical modulator to modulate an optical carrier to carry a resulting redundancy-encoded data stream as a corresponding stream of constellation symbols such that the seed bitstream determines a stream of sign or parity values of the constellation symbols; and
wherein the stream of the constellation symbols is such that an occurrence rate of specific constellation symbols therein decreases with symbol energies.

2. The apparatus of claim 1, wherein the stream of sign or parity values is a stream of sign values, the seed bitstream determining said stream of sign values.

3. The apparatus of claim 1, wherein the stream of sign or parity values is a stream of parity values, the seed bitstream determining said stream of parity values.

4. The apparatus of claim 1, wherein the electronic encoder is configured to redundancy-encode the input data stream in a pseudo-probabilistic manner.

5. The apparatus of claim 1, wherein the electronic encoder is configured to maintain a constant ratio between a number of bits applied thereto by the input data stream and a resulting number of constellation symbols in the corresponding stream of constellation symbols.

6. The apparatus of claim 1,
wherein the electronic encoder comprises a dither-stream generator configured to generate a dither stream in response to the seed bitstream, the dither stream comprising a sequence of first bit-words, each of said first bit-words being generated to encode a corresponding bit of the seed bitstream in a designated bit thereof; and wherein the electronic encoder is configured to generate the corresponding stream of constellation symbols using the dither stream.

7. The apparatus of claim 6, wherein the electronic encoder further comprises:
a digital circuit configured to generate a stream of second bit-words in response to a plurality of sub-streams of the input data stream, each of said second bit-words being generated to have a fixed parity; and
an adder operatively connected to the digital circuit and to the dither-stream generator to generate a stream of output bit-words, each of said output bit-words being computed as a sum of a respective one of said first bit-words and a respective one of said second bit-words; and
wherein the stream of the constellation symbols is generated using the stream of output bit-words.

8. The apparatus of claim 7,
wherein the digital circuit is configured to generate each of said second bit-words to have a respective N-bit value, where N is a positive integer greater than one;
wherein the dither-stream generator is configured to generate each of said first bit-words to have a respective M-bit value, where M is a positive integer greater than N; and
wherein the dither-stream generator is further configured to cause said first bit-words to have values from a range of values selected such that each of said output bit-words has a respective M-bit value.

9. The apparatus of claim 7, wherein the digital circuit is configured to generate the stream of second bit-words such that the fixed parity causes each of said second bit-words to have a respective even value.

10. The apparatus of claim 7, wherein the plurality of sub-streams does not include the seed bitstream.

11. The apparatus of claim 6, wherein the dither-stream generator is configured to generate the dither stream such that a distribution of values of the first bit-words is approximated by a Gaussian function.

12. The apparatus of claim 6, wherein the dither-stream generator comprises:
a plurality of scramblers, each configured to generate a respective scrambled bitstream in response to receiving a respective copy of the seed bitstream, the respective scrambled bitstreams being different from one another;
an adder configured to generate a stream of second bit-words, each of said second bit-words being generated as a sum of binary values carried by the respective scrambled bitstreams in a respective time slot; and
a bitstream combiner configured to generate the dither stream using the seed bitstream and the stream of second bit-words.

13. The apparatus of claim 12, wherein each of the plurality of scramblers is configured to generate the respective scrambled bitstream by changing an order of bits of the seed bitstream in a different respective manner.

14. The apparatus of claim 1, wherein the electronic encoder comprises an FEC encoder configured to cause the corresponding stream of constellation symbols to include parity-check constellation symbols.

15. An apparatus comprising:
an electronic encoder configured to generate a stream of output bit-words in response to an input data stream, said input data stream including a seed bitstream as a sub-stream thereof, each of said output bit-words being generated to encode a corresponding bit of the seed bitstream in a designated bit thereof, wherein different values of said output bit-words have different respective rates of occurrence; and
an optical transmitter operatively coupled to the electronic encoder to transmit a modulated optical signal carrying a sequence of constellation symbols generated using the stream of output bit-words.

* * * * *